United States Patent
Shepley et al.

(10) Patent No.: US 7,341,177 B2
(45) Date of Patent: Mar. 11, 2008

(54) AUTOMATED TRANSACTION MACHINE SYSTEM AND METHOD

(75) Inventors: Steven Shepley, Uniontown, OH (US); Joseph Cwikla, Tallmadge, OH (US); Bryan Reed, Canal Fulton, OH (US); James Block, North Lawrence, OH (US); Robert Usner, Morrisville, NC (US); Jay Paul Drummond, Massillon, OH (US); Mark D. Smith, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 1610 days.

(21) Appl. No.: 09/863,911

(22) Filed: May 23, 2001

(65) Prior Publication Data

US 2001/0037301 A1    Nov. 1, 2001

Related U.S. Application Data

(63) Continuation-in-part of application No. 09/193,637, filed on Nov. 17, 1998, and a continuation-in-part of application No. PCT/US97/21422, filed on Nov. 25, 1997.

(60) Provisional application No. 60/207,043, filed on May 25, 2000, provisional application No. 60/098,907, filed on Sep. 2, 1998, provisional application No. 60/095,626, filed on Aug. 7, 1998, provisional application No. 60/091,887, filed on Jul. 7, 1998, provisional application No. 60/031,956, filed on Nov. 27, 1996.

(51) Int. Cl.
*G06Q 40/00* (2006.01)

(52) U.S. Cl. ............................ 235/379; 902/8; 902/13; 902/14; 902/15

(58) Field of Classification Search ................ 235/379, 235/380; 902/8, 13, 14, 15
See application file for complete search history.

(56) References Cited

U.S. PATENT DOCUMENTS

2002/0138446 A1* 9/2002 Antonin et al. ................ 705/67
2003/0055876 A1* 3/2003 Korala et al. ................ 709/203

* cited by examiner

*Primary Examiner*—Daniel Hess
(74) *Attorney, Agent, or Firm*—Christopher L. Parmelee; Ralph E. Jocke; Walker & Jocke LPA

(57) ABSTRACT

An automated transaction machine (20) with a cross-vender software and hardware platform architecture. The machine includes a computer (22) and a plurality of transaction function devices (32) in operative connection with the computer. The machine further includes a plurality of device driver components (38) that generally correspond to each of the transaction function devices. The device drivers are operative responsive to communication from an XFS layer (28) to control the operation of the transaction function devices. The machine further includes a terminal application (22) and an ODS layer (26). The ODS layer includes a plurality of ODS components (36) that generally correspond to the device drivers and/or transaction function devices. The ODS components responsive to the terminal application are operative to have the device drivers control the operation of the transaction function devices through communication with the XFS layer.

43 Claims, 4 Drawing Sheets

AUTOMATED TRANSACTION MACHINE SYSTEM AND METHOD

CROSS REFERENCE TO RELATED APPLICATIONS

This application claims benefit of U.S. Provisional Application Ser. No. 60/207,043 filed on May 25, 2000 and is a continuation-in-part of copending U.S. application Ser. No. 09/193,637 filed on Nov. 17, 1998 which is a continuation-in-part of International Application PCT/US97/21422 filed on Nov. 25, 1997 and which designated the U.S. (now U.S. application Ser. No. 09/077,337). The nonprofessional applications designated above, namely application Ser. No. 09/193,637 filed Nov. 17, 1998 and PCT/US97/21422 filed on Nov. 25, 1997 (now Ser. No. 09/077,337) claims the benefit of U.S. Provisional Applications Nos.: 60/031,956 filed on Nov. 27,1996; 60/091,887 filed on Jul. 7, 1998; 60/095,626 filed Aug. 7 1998; and 60/098,907 filed Sep. 2, 1998.

TECHNICAL FIELD

This invention relates to an automated transaction machine architecture. Specifically this invention relates to a new cross-vendor software and hardware platform architecture for automated transaction machines.

BACKGROUND ART

Automated transaction machines are known in the prior art. Automated transaction machines are used to electronically carry out transfers representative of value. Automated transaction machines include for example, cash dispensers, ticket dispensers, scrip dispensers, gaming machines, Automated Teller Machines (ATMs) and other self service terminals. For purposes of convenience all such automated transaction machines will be referred to herein as ATMs unless otherwise specifically indicated.

ATMs may include various types of transaction function devices. These devices are operated to carry out transactions. Different types of ATMs include different types of devices. The different types of devices enable the ATM to carry out different types of transactions. For example, some types of ATMs include a depository for accepting deposits while other ATMs do not. Some ATMs have a "touch screen" while others have separate displays and input buttons. ATMs can also be fitted with devices such as cash and coin acceptors, statement printers, check validators, bill acceptors, thumb print readers and other types of devices, while other ATMs do not include such devices.

Many financial institutions wish to add new functionality to their existing ATMs. For example, a bank with ATMs for dispensing cash may wish to add a statement printer to each of the ATMs for printing a customer's banking statement. Such new functionality usually requires additional software modifications to the ATM in addition to the new hardware. Unfortunately the process of updating ATM software is typically complicated by the fact that many financial institutions purchase ATM hardware from more than one manufacturer. Thus to add new software for performing a new function such as printing banking statements, separate applications must be written or modified for each vendor specific ATM platform. Porting applications to multiple ATM platforms significantly reduces the productivity of the ATM software developers. Consequently, there exists a need for an architecture that enables developers to write ATM applications that work without modification on a plurality of proprietary ATM platforms.

To achieve this goal industry standards are being developed which are designed to enable ATM hardware and software to be cross-vender compatible. One example of such a standard is WOSA/XFS (Windows Open Services Architecture/eXtensions for Financial Services) which is defined by the CEN/ISSS XFS standard committee. FIG. 1 shows a schematic view of the standard WOSA/XFS architecture. An exemplary WOSA/XFS enabled ATM 110 may include a WOSA/XFS Manager 112. The WOSA/XFS Manager 112 includes a standardized interface to enable an ATM terminal application 114 to communicate with ATM transaction function devices 116. Each transaction function device 116 includes a corresponding service provider interface (SP) 118. The SPs 118 are supplied by the vendors of the ATM devices 116 and are specially designed to accept requests from the WOSA/XFS Manager 112 and pass those requests on to the corresponding device 116. Theoretically the ATM terminal application 114 will be able to run on any vendor's ATM hardware 120 as long as both the ATM terminal application 114 and the vendor's implementation of the SPs 118 adhere to the WOSA/XFS specifications.

Another example of an emerging industrial standard for an ATM hardware/software architecture is J/XFS (Java/eXtensions for Financial Services). Unlike WOSA-XFS which is designed for Microsoft Windows® platforms only, J/XFS is a Java® based architecture that may be implemented on any hardware/software platform that supports a Java® Virtual Machine (JVM). As shown in FIG. 2, a J/XFS enabled ATM 210 may include a J/XFS Kernel. The J/XFS Kernel is similar in functionality to the previously described WOSA/XFS Manager 112, however the J/XFS Kernel runs in a JVM 224. The J/XFS Kernel is operative responsive to commands from an ATM terminal application 214 to have a device service layer 220 control the operation of ATM devices 216. Like the previously described SPs 18, the device service layer 220 includes vendor provided device services 218 that correspond to the vendor's hardware devices 216.

As with the WOSA/XFS architecture, the ATM terminal application 214 will theoretically be able to run on any vendor's ATM hardware as long as both the ATM terminal application 214 and the vendor's implementation of the device services 218 adhere to the J/XFS specifications. Unfortunately with each of these described architectures there are "grey" areas within the standards that are subject to vendor interpretation. Because of these "grey" areas some vendors have created WOSA/XFS SPs that work differently for the same type of device as another vendor's SPs. Also, some vendors have deliberately made modifications to portions of an SP interface or to its operation for reasons that are uniquely theirs. The consequence of this is that what is intended to be a cross-vendor ATM application will most likely have to be modified or "tweaked" before it will truly operate with another vendor's SPs.

For example the WOSA/XFS standard provides a number of different methods for having a card reader SP interface with a card reader for returning information read from a card. These methods include a first method of passing individually selected information and a second method of passing all the card information in a single form. Although it would seem that an application could use either method to retrieve card information from any vendor's card reader, in reality one vendor's card reader SP may only support the first method, whereas a second vendor's card reader SP may only support the second method. These types of incompatibilities or differences in interpretation of the WOSA/XFS standard undermine the intended goal of cross-vendor compatibility between ATM applications and ATM hardware.

Although the J/XFS architecture is just being developed it shares the similar WOSA/XFS architecture limitation of using device services that are vendor provided. As a result different vendor interpretations of the J/XFS specification have the potential of forcing developers to write modified versions of their ATM terminal applications for each vendor's ATM platform. Consequently there exists a need for an ATM architecture that addresses these deficiencies in the WOSA/XFS or J/XFS architectures, or any other ATM architecture that is subject to vendor interpretation for developing device drivers.

In general each of the previously described XFS architectures defines a standard for the lowest common denominator of ATM hardware features. Unfortunately by including only those features that are common to all ATM hardware devices, the XFS standards cannot include interfaces to unique features associated with a vendor's particular implementation of a transaction function device. One example of unique features that are not implemented in the XFS interfaces includes access to low level diagnostic testing of individual hardware components of a device. Such control over low level hardware functionality can be very useful when troubleshooting problems with a specific component such as a motor or sensor. Unfortunately as each vendor may mechanically and/or electronically construct a particular type of device completely differently than another vendor, the XFS standards have not attempted to implement methods for testing low level vendor specific hardware. Consequently there further exists a need for an XFS enabled ATM that offers low level diagnostic testing of ATM hardware.

DISCLOSURE OF INVENTION

It is an object of the exemplary form of the present invention to provide a cross-vender compatible automated transaction machine architecture.

It is a further object of the exemplary form of the present invention to provide a cross-vender compatible automated transaction machine architecture that improves the ability of a single application to function properly on different ATM platforms.

It is a further object of the exemplary form of the present invention to provide a cross-vender compatible automated transaction machine architecture with features for troubleshooting ATM hardware.

It is a further object of the exemplary form of the present invention to provide a cross-vender compatible automated transaction machine architecture with features that simplify programming of ATM applications.

Further objects of the present invention will be made apparent in the following Best Modes for Carrying Out Invention and the appended claims.

The foregoing objects are accomplished in one exemplary embodiment of the invention by an ATM that comprises a computer and a plurality of transaction function devices in operative connection with the computer. The ATM further includes at least one XFS layer such as the WOSA/XFS Manager or the J/XFS kernel. In addition, the ATM includes a device driver layer that includes vendor provided device drivers such as the WOSA/XFS service providers or the J/XFS device services. The device drivers generally correspond to each of the transaction function devices and are responsive to commands from the XFS layer to control the operation of the transaction function devices.

The ATM further includes at least one terminal application and an Open Device Services (ODS) layer. The ODS layer includes a plurality of ODS components that generally correspond to the device drivers and/or transaction function devices. An ODS component is operative responsive to the terminal application to control at least one transaction function device through communication with the XFS and device driver layers. The ODS component layer is adapted to provide the terminal application with a consistent interface for communicating with vendor provided device drivers which may have inconsistent implementations for interfacing with the particular XFS layer.

In one exemplary embodiment the ODS layer is operatively programmed to communicate with device drivers from different vendors such that each of the corresponding transaction function devices operate the same. In another exemplary embodiment the ODS layer is operative to include ODS components that are exchangeable to correspond to different vendor implementations of a device driver for a particular type of transaction function device. For example if the ATM includes a card reader and a corresponding device driver from vendor A, the ODS layer is operative to include a first ODS component that is compatible with vendor A's device driver and card reader. If the card reader from vendor A is exchanged with a new card reader and corresponding device driver from vendor B, the ODS layer is operative to enable the first ODS component to be exchanged with a second ODS component that is compatible with Vendor B's device driver and card reader. Both the first and second ODS components include identical interfaces which are accessed by the terminal application in the same manner to have either vendor's A or Vendor B's card reader perform the same card reader functions. Regardless of whether the ODS layer includes an ODS component that corresponds to a first vendor's, a second vendor's or any other vendor's transaction function device, the terminal application is operative to communicate with the ODS layer to have any vendor's hardware perform the same functions.

In an alternative embodiment of the present invention, the ODS layer is further operative to communicate with more than one XFS layer. For example an ATM may include both a WOSA/XFS Manager and a J/XFS Kernel with different sets of devices for each XFS layer. As discussed previously J/XFS is a Java® based architecture that may be implemented on any hardware/software platform that supports a Java® Virtual Machine (JVM). Examples of automated transaction machines that include a Java based architecture are found in U.S. application Ser. No. 09/193,637 which is incorporated herein by reference in its entirety. Rather than developing a complex terminal application that must be specifically programmed to access different XFS layers, in the exemplary embodiment of the present invention, the terminal application only needs to be programmed to communicate with the ODS layer as previously described. The ODS layer is operative to route the terminal application commands through the correct XFS layer. Those devices that include WOSA/XFS service provider interfaces will have corresponding ODS components that are operative to communicate with the WOSA/XFS Manager. Those devices that include J/XFS device services will have corresponding ODS components that are operative to communicate with the J/XFS Kernel. In a further alternative embodiment, each ODS component is operative to communicate with either XFS layer depending on ODS configuration parameters which specify which XFS layer each ODS component should use to communicate with devices.

To further simply the task of developing terminal application software, the exemplary embodiment further comprises terminal element controls (TECs). TECs are high level programming objects that encapsulate much of the low level functions and structures needed to interact with one or more transaction function devices. TEC objects may be operatively configured in any object package that the terminal application designer prefers. Examples of operative object configurations for TECs include OCXs, Active X objects, COM object, JavaBeans, EJBs or any other object that can be integrated into a terminal application.

For example an interface to a card reader in the previously described XFS architecture includes a complex assortment of methods and structures that must be dealt with just to operate a card reader and to read a card. Integrating this interface into a terminal application can require significant effort. An exemplary card reader TEC object of an embodiment of the invention provides a simplified interface that includes five methods: 1) enable the card reader; 2) read a card; 3) write a card; 4) return a card; and 5) retain a card. Exemplary TEC objects also include configurable parameters or properties such as the amount of time that a card should be presented to a customer before it is retained.

With the described exemplary architecture, the terminal application can be programmed in any language or on any platform that can either directly access the ODS layer or that can incorporate TEC objects. In this manner a terminal application can be developed as a stand alone Windows® application, a browser based application, Java® application, or any other type of application that is operative to incorporate TEC Objects.

TEC objects of the exemplary embodiment are also operative to combine functions that span multiple devices. For example a card reader TEC may also interact with related hardware such as a light indicator to draw a customer's attention to the card reader. In addition the exemplary card reader TEC may also interact with a beeping device for signaling the customer to remove their card from the card reader. In a pure XFS application these simple actions would require low level coding to all three XFS interfaces that correspond to the card reader, sensors/indicators and sound device. In the exemplary embodiment the TEC objects are operative to interface with the previously described ODS layer. However, in alternative embodiments the TEC objects may be operatively programmed to access the XFS layer directly.

In addition to enabling new terminal applications to be written for cross-vendor hardware compatibility, exemplary embodiments are operative to enable pre-existing proprietary terminal applications to run on another vendor's hardware. For example proprietary terminal control software typically includes a plurality of proprietary drivers for controlling a plurality of different transaction function devices. When new devices are developed or improved the proprietary terminal applications are typically updated to include new proprietary drivers for controlling the new or updated hardware. In one exemplary embodiment of the present invention the proprietary terminal application software may be updated to indirectly access ATM hardware through the ODS layer rather than through the proprietary drivers. By accessing the ODS layer, proprietary terminal control software is operative to function on any vendor's hardware that is XFS enabled.

In another alternative embodiment of the present invention the device drivers such as the WOSA/XFS service providers or the J/XFS device services are adapted to include a diagnostic interface. The diagnostic interface provides external applications with access to specific low level features of the hardware that corresponds to the device drivers. For example a cash dispenser device driver may be adapted to include an interface for manipulating individual motors or sensors in the corresponding cash dispenser transaction function device. Such access is provided to applications independently of the XFS layer. In an exemplary embodiment, a diagnostic application may be operatively programmed to access the diagnostic interfaces of a plurality of different device drivers. Such an exemplary diagnostic application may use the XFS layer to deactivate one or more devices from XFS communication. Once the devices have been taken off-line with respect to the XFS components, the diagnostic application may enable a programmer or service technician to directly access ATM hardware through the corresponding diagnostic interface for trouble shooting, repair and other maintenance purposes.

BEST MODES FOR CARRYING OUT INVENTION

Figure 1:
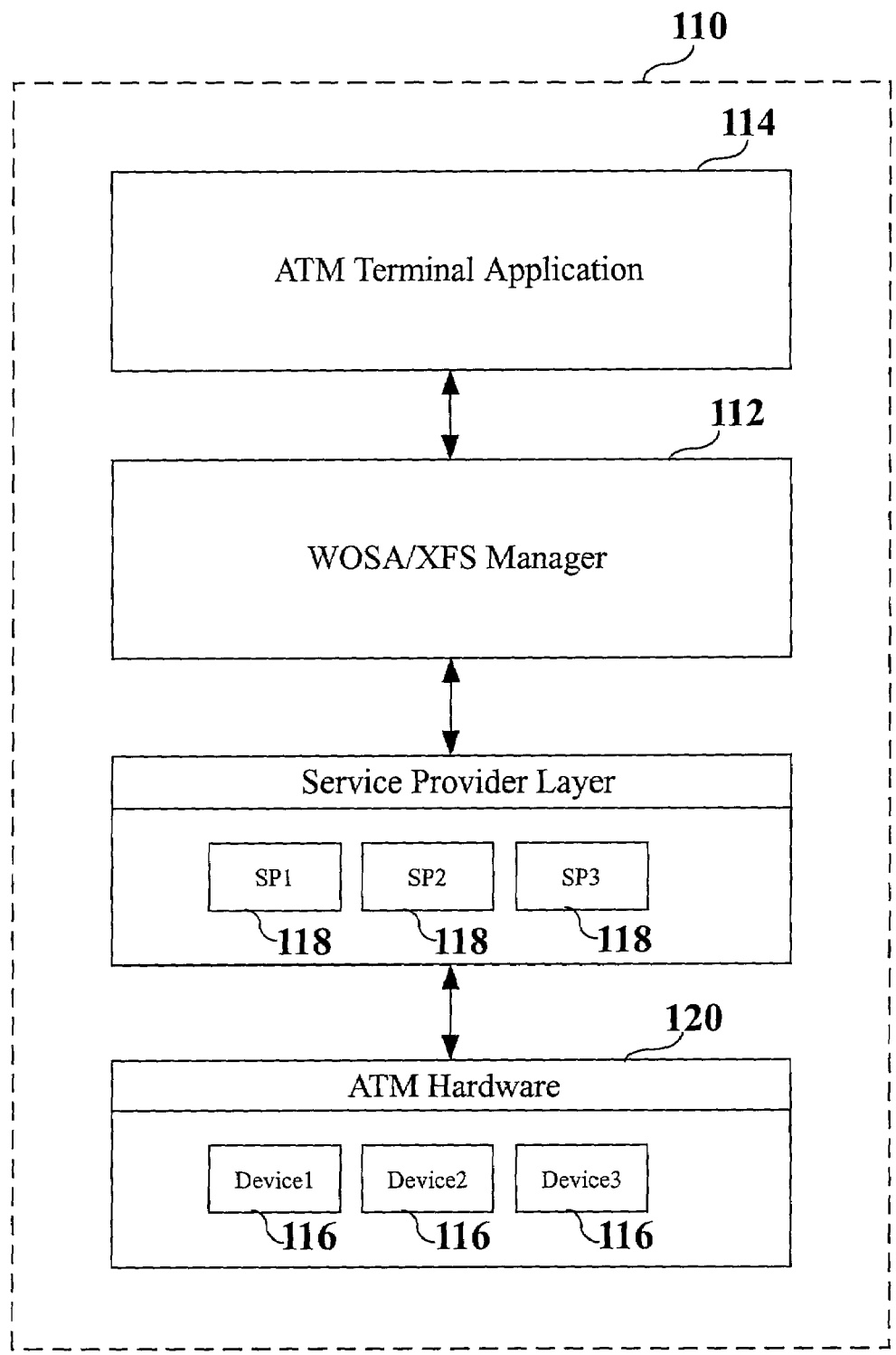
FIG. 1 is a schematic view representative of a WOSA/XFS enabled ATM.
Figure 2:
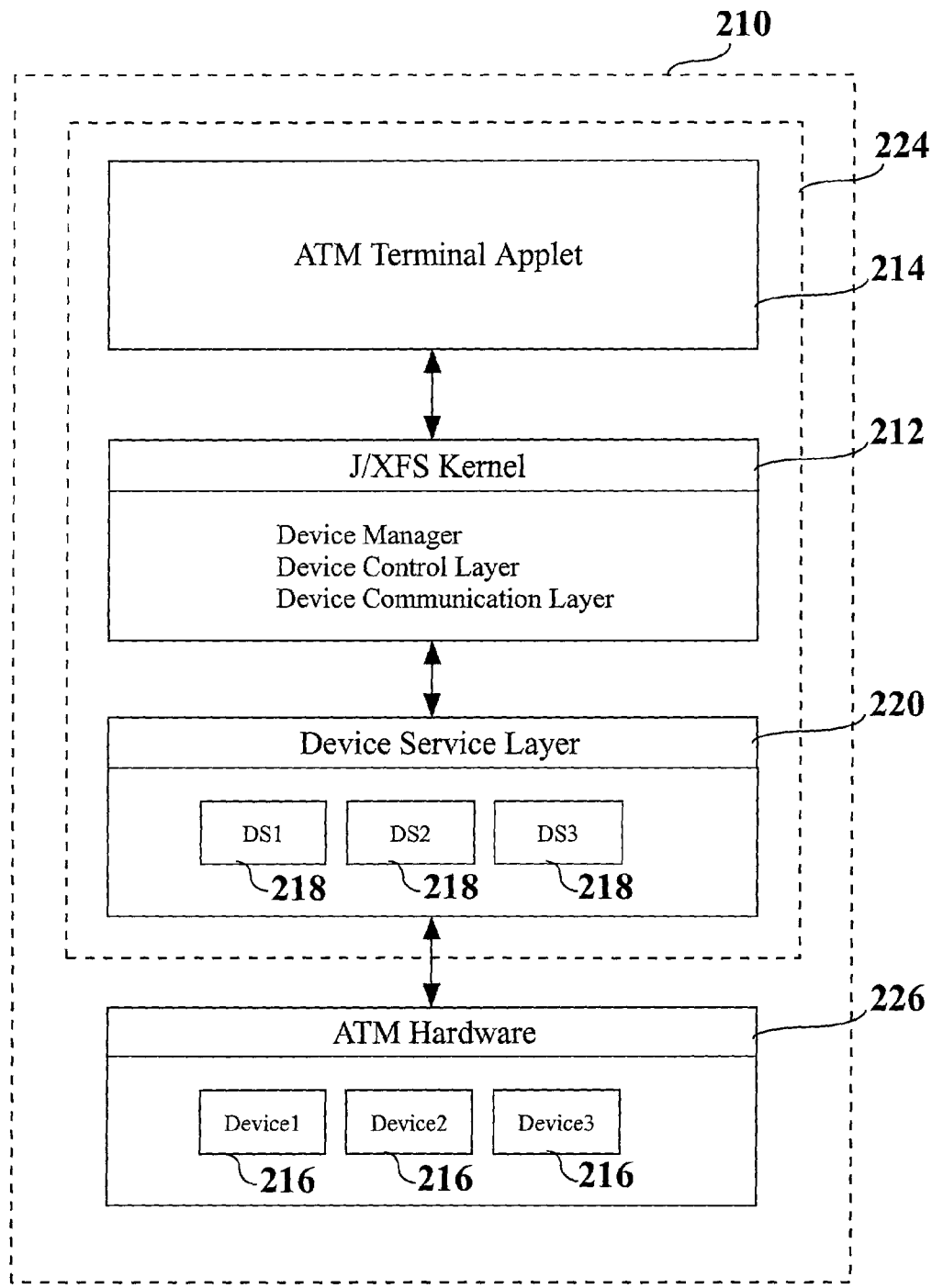
FIG. 2 is a schematic view representative of a J/XFS enabled ATM.
Figure 3:
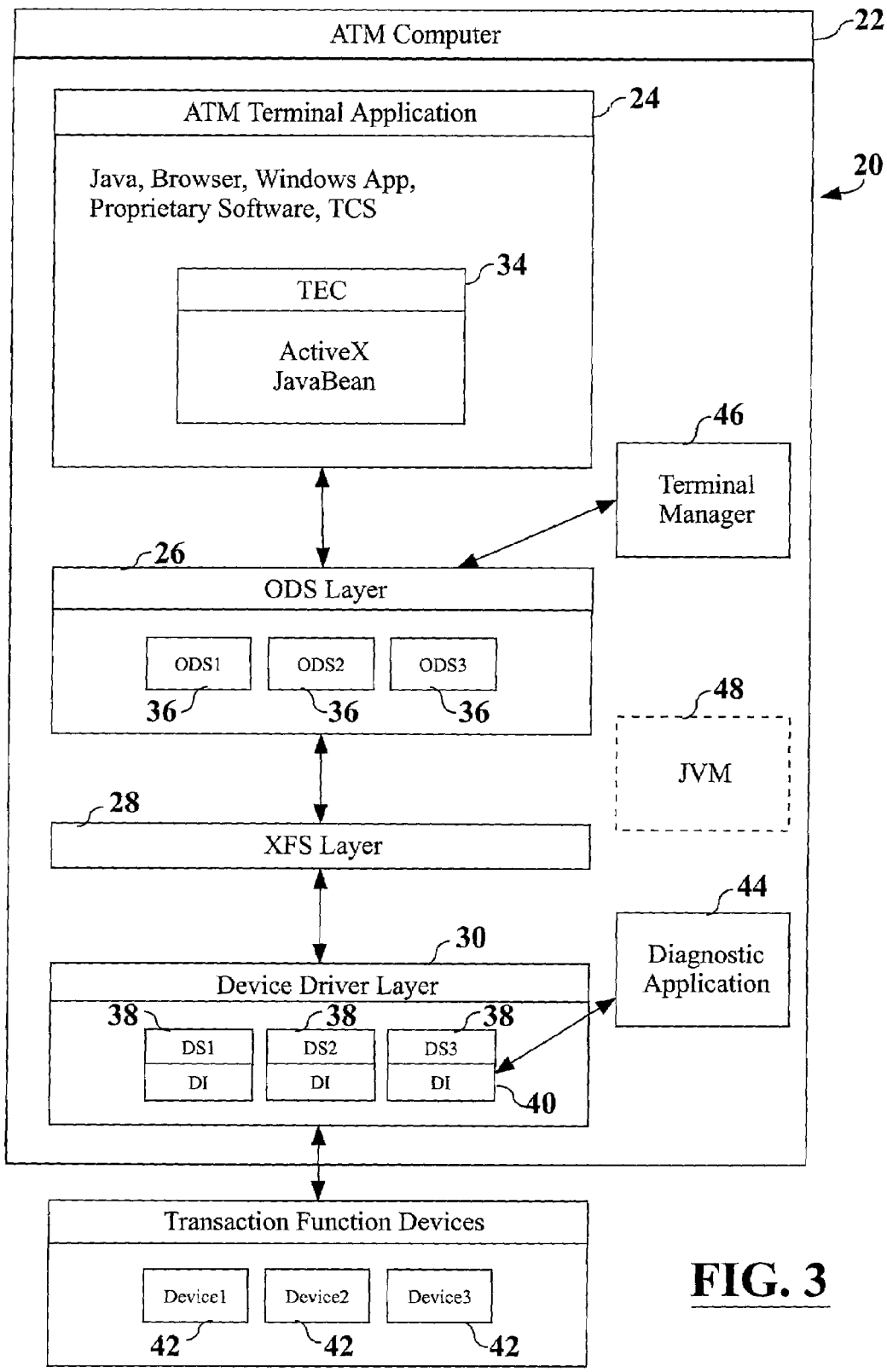
FIG. 3 is a schematic view representative of an exemplary XFS enabled ATM.

Referring now to the drawings and particularly to FIG. 3, there is shown therein a schematic view representative of an exemplary embodiment of a cross-vendor ATM architecture 20 for the present invention. Here the ATM architecture 20 includes an computer 22 that is in operative connection with a plurality of transaction function devices 42. Such transaction function devices may include for example such devices as a note dispenser, coin dispenser, card reader, printer, key pad, display device, function keys, depositor, cash acceptor or any other hardware device that may be operatively connected to an ATM.

The computer 22 includes a software components including terminal application 24 that is operative to control the operation of the transaction function devices 42. The computer 22 further includes an XFS layer 28 that corresponds to a multi-vendor supported interface for ATM devices such as the WOSA/XFS Manager or the J/XFS Kernel. In addition, the computer 22 further includes a device driver layer 30 that includes a plurality of device driver components 38 that correspond to the XFS layer. For example if the XFS layer corresponds to the WOSA/XFS Manager, the device driver components 38 correspond to the WOSA/XFS service provider interfaces. If the XFS layer corresponds to the J/XFS Kernel, the device driver components 38 correspond to the J/XFS device services.

For each transaction function device 42, a device driver 38 must be installed in the computer that is operative to enable commands passed through the XFS layer 28 to control the operation of the transaction function devices 42. In one exemplary embodiment the device drivers 38 are manually installed from a portable physical media such as a disk or CD supplied by the manufacture of the device. In another exemplary embodiment the device drivers are operatively downloaded from a data store of device drivers that is in operative connection with the computer. In a further exemplary embodiment the device drivers are retrieved by the computer 22 from the transaction function devices 42 themselves using a service configuration protocol such as Sun Microsystems JINI™ or Microsoft Universal Plug and Play™.

Each of the device drivers 38 are operative responsive to the XFS layer 28 to have at least one transaction function device 42 perform a function. For example a card reader device driver is operative responsive to a read card request from the XFS layer 28 to have its corresponding card reader device physically read information from a card and return the information through the XFS layer. Another device driver such as a note dispenser device driver is operative responsive to a dispense request from the XFS layer 28 to have its corresponding cash dispenser dispense an amount of notes.

In the exemplary embodiment of the present invention the terminal application 24 is operative to control transaction function devices 42 through communication with the XFS layer 28. However, rather than having the terminal application 24 communicate with the XFS layer directly, the exemplary embodiment includes an ODS layer 26 operative in the computer 22 between the terminal application 24 and the XFS layer 28. The ODS layer 26 is operative responsive to the terminal application 24 to control the functionality of transaction function devices 42 through communication with the XFS and device driver layers 28 and 30. The ODS layer 26 includes a plurality of ODS components 36 that generally correspond to the device drivers 38 and/or the transaction function devices 42. For example the exemplary embodiment of the present invention may include a card reader ODS component that corresponds to a card reader device driver for a card reader. An exemplary embodiment of the present invention may also include a note dispenser ODS component that corresponds to a note dispenser device driver for a note dispenser.

When device drivers from two or more vendors generally communicate with the XFS layer in a consistent manner, a single ODS component may be used when either of the drivers are installed in the ATM. However, if the vendor specific device drivers implement communication with the XFS layer in a different manner, vendor specific ODS components may be operatively programmed for each of the vendor specific device drivers. A vendor specific ODS component may then be installed in the ODS layer responsive to whichever vendor specific device driver is installed in the ATM. The vendor specific ODS component is operative to communicate through the XFS layer in a manner that is appropriate for the particular implementation of the vendor specific driver.

Although each vender specific ODS component may communicate with the XFS layer in a different manner, all of the vendor specific ODS components for a particular type of device share a common interface for access by external applications such as the terminal application 24. The ODS layer 26 is thus operative to isolate the inconsistencies in communication between different device drivers, and to present the terminal application 24, or any other application, with a common set of methods, properties and events for communicating with transaction function devices from different vendors.

The present exemplary form of the invention encompasses a testing process that is operative to identify unique characteristics and/or inconsistencies in a vendor's implementation of a device driver and to operatively adapt ODS components to include those features that are necessary to properly and consistently communicate with the device driver through the XFS layer.

In general the testing process includes the configuration of the particular vendor's hardware device and corresponding device driver on an XFS enabled test platform. The test platform typically includes a computer system with an XFS layer and an ODS component that corresponds to the particular type of the vendor's device. For example if the particular device being tested is a note dispenser, an ODS component that corresponds to an XFS device driver for a note dispenser is installed in the test platform.

The test platform further includes a testing application. The testing application is operative to interface with the ODS component and issue a plurality of commands through the ODS component to control the operation of the vendor's device. A user may monitor and/or interact with the device and the test application to determine which functions of the device may or may not work properly with the ODS component.

For example when testing a card reader the testing application enables a user to issue a command to the ODS component to have the device read a card. The testing application is further operative to output to the user the results of the operation. If the operation appears to work correctly, the testing application may display the contents of the information read from the card. A user may then verify that the contents are correct. If the operation failed, the user may evaluate the error messages that are generated. In addition if the operation triggers an unexpected event through the XFS layer, the testing application is further operative to report what events have been triggered as a result of the operation.

In addition to monitoring the testing application, the user may also monitor the actual device to determine if the operation produces the correct function. For example if the device corresponds to a note dispenser, the testing application may include an operation to dispense a certain amount of cash or number of notes through communication with a cash dispenser ODS. By monitoring the cash dispenser the user can determine if the correct amount of cash was dispensed, for example. After functional problems between the current ODS component and the device have been identified, the ODS component may be operatively modified to compensate for the idiosyncrasies associated with the vendor's implementation of the device driver. The modified ODS component may then be further tested on the testing platform to either uncover further inconsistencies or to certify that the ODS component works properly. Once an ODS component has been certified, it may be installed in any ATM that includes the tested vendor's device, device driver and corresponding XFS layer to enable a terminal application to properly control the device's functionality.

In the exemplary embodiment the terminal application 24 may be based on any programming architecture that is operative to communicate with the ODS layer 26. In one exemplary embodiment the terminal application may be a stand-alone, Windows®-based application. In an alternative exemplary embodiment the terminal application may include a browser and a plurality of web page documents. In another exemplary embodiment the terminal application may be a Java® application that is operative in a Java Virtual Machine (JVM).

In addition the ODS layer may be based on any programming architecture that is operative to communicate with the XFS layer 28. For example if the XFS layer corresponds to a J/XFS Kernel running in a JVM 48 of the computer 22, the ODS components may be constructed as Java Beans that are operative in the JVM. If the XFS layer corresponds to the WOSA/XFS Manager, the ODS components may be constructed as a plurality of Windows® based DLLs. If portions of the XFS layer and/or terminal application are both Windows® based and Java® based, the ODS layer may include components operative in the JVM and components operative as DLLs. In other embodiments, the ODS layer and terminal application may be configured as other types of applets, modules or libraries which are appropriate for the operating system architecture and the XFS layer.

To enhance the productivity of programmers who develop a terminal application, the exemplary embodiment of the present invention comprises the integration of transaction element components (TECs) 34 with the terminal application 24. TECs are objects or classes such as ActiveXs or Java Beans that encapsulate the complex operation of one or more transaction function devices 42 into a package of streamlined methods, properties and events. The TEC objects include the necessary functionality to communicate with the ODS layer. In the exemplary embodiment an entire terminal application can be constructed from TEC objects. Although the ODS components 36 may generally have a one to one relationship with corresponding device drivers 38 and/or transaction function devices 42, the TEC objects combine logical groupings of functions for different devices resulting in the TEC objects having a generally one to many relationship with ODS components.

Figure 4:
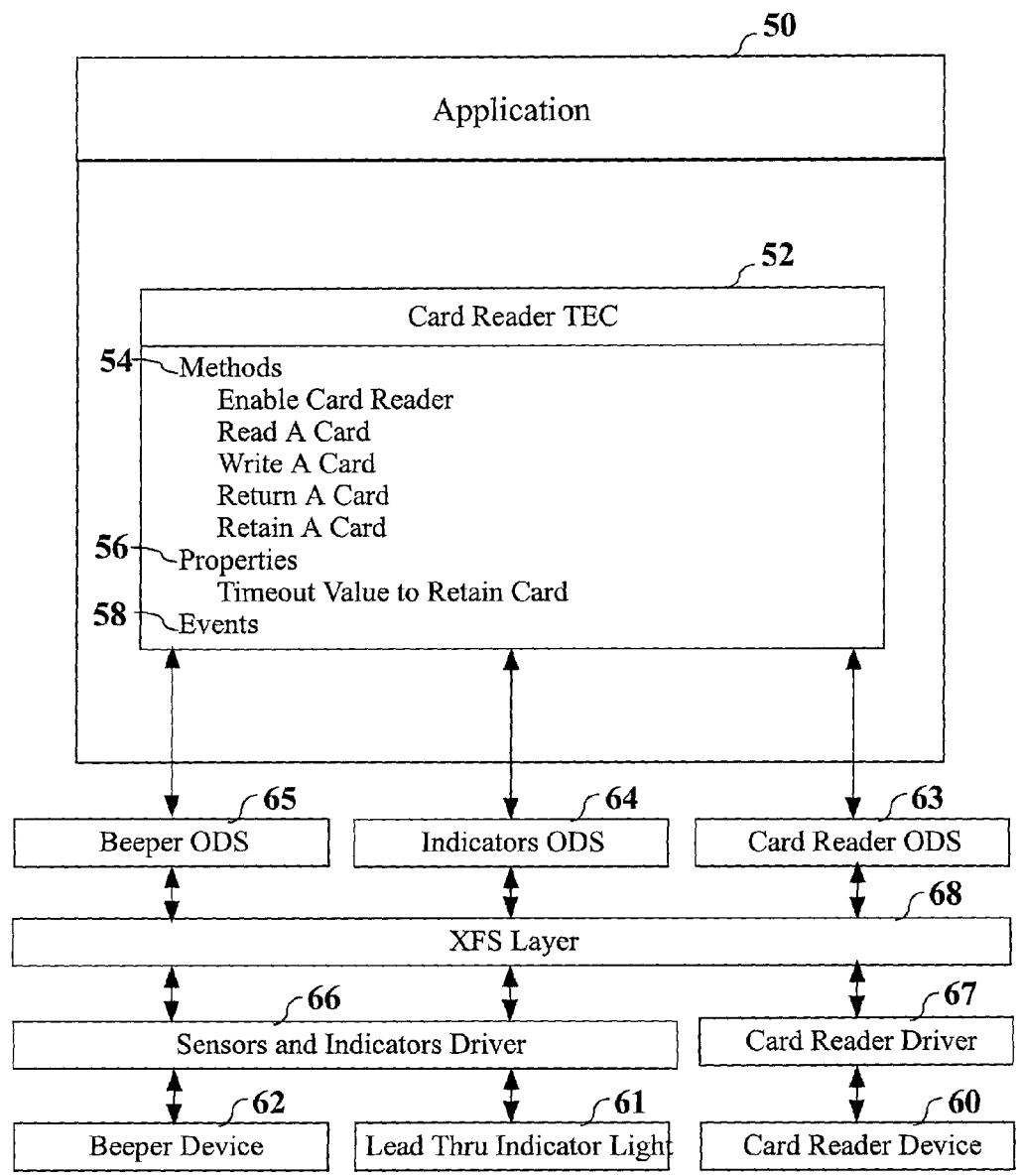
FIG. 4 is a schematic view representative of an exemplary terminal application that includes an exemplary card reader TEC to interact with exemplary ODS components.

FIG. 4 shows an exemplary terminal application 50. The terminal application includes a card reader TEC 52. The application 50 is operative to invoke methods 54 of the card reader TEC 52 such as enable card reader, read a card, write a card, return a card and retain a card. The application 50 is further operative to set properties 56 of the card reader TEC 52 such as the time out value before a card is returned by the card reader. In addition, the application is further operative to monitor one or more events 58 that are triggered through the card reader TEC.

The exemplary card reader TEC 52 is operative to communicate with three different hardware devices including a card reader device 60, a lead through indicator device 61 and a beeper device 62. The exemplary card reader TEC 52 interfaces with these devices through communication with three corresponding ODS components including a card reader ODS 63, an indicator ODS 64 and a beeper ODS 65.

Through communication with the card reader ODS 63, the card reader TEC 52 is operative to have the card reader device 60 perform a plurality of functions such as enabling the card reader, reading a card and returning the card to a customer. The card reader ODS communicates with the card reader device through the XFS layer 68 and the card reader driver 67. When enabling the card reader, the exemplary card reader TEC 52 is further operative to automatically activate a lead thru indicator light 61 to draw a customer's attention to the card reader 60. This is performed by communicating with a sensors and indicators device driver 66 through interaction with the indicators ODS 64. In addition, when a beeping sound is desired to signal the customer to remove their card, the exemplary card reader TEC 52 interacts with the beeper ODS 65 to have the sensors and indicators driver 66 activate the beeper device 62. The exemplary TECs of the present invention are operative to combine device interaction in a logical manner by communicating with more than one ODS component and corresponding devices in response to various methods of the TEC being invoked.

In addition to enabling the generation of cross-vender compatible terminal applications that either include TEC objects, or that are operative to interface with the ODS layer directly, the exemplary embodiment of the present invention encompasses adapting pre-existing and proprietary terminal control software of one vendor to run on another vendor's ATM hardware. Such proprietary terminal control software typically communicates with a plurality of proprietary device drivers directly without accessing a middle layer interface such as the previously described XFS layers. Consequently proprietary terminal control software has previously been limited to running only on a specific vendor's hardware platform. However, the exemplary embodiment of the present invention is further operative to enable such proprietary software to properly control another vendor's transaction function devices when installed on another vendor's ATM platform. This is achieved by adapting the proprietary software to communicate with ODS components rather than proprietary device drivers. Once the proprietary terminal control software has been so adapted, the software is operative to run on another vendor's ATM platform that includes an XFS layer and corresponding XFS compatible device drivers.

As shown in FIG. 3, the exemplary XFS compatible device drivers 38 of an exemplary form of the present invention may further include diagnostic interfaces 40 in addition to their interfaces with the XFS layer 28. The diagnostic interfaces 40 include additional low level hardware control functions that may be accessed by external applications. The low level functions for example may access specific motors, sensors and other components in the corresponding transaction function devices 42. By employing a diagnostic application 44 to access these low level functions of the device drivers 38 directly, individual mechanical and electronic functions specific to the device can be tested, analyzed and possibly corrected.

In a further exemplary form of the present invention, the diagnostic interfaces 40 of the device drivers 38 may include an authentication system which is operative to validate that the application attempting to access the low level functions of the device is authorized to do so. In one exemplary embodiment of the authentication system, the diagnostic interface 40 is operative to detect that a valid hardware device such as a dongle is in operative connection with the ATM before an external application is granted access to the transaction function device 42 through the diagnostic interface 40.

In an alternative exemplary embodiment of the authentication system, the diagnostic interface 40 is operative to detect whether a valid license key is present. Such a license key for example may be located on a removable media in operative connection with the ATM such as a floppy disk, CD, magnetic stripe card, smart card, or any other portable medium that the diagnostic interface is operative to access through the machine. The license key may also be associated with the specific application such as the diagnostic application 44 that is operatively programmed to access the diagnostic interfaces of device drivers 38. Communications from the diagnostic application may be required to include a valid license key before the diagnostic interface enables the diagnostic application to access the transaction function device.

In a further exemplary embodiment of the authentication system, the diagnostic interfaces 40 may include a secret password or digital certificate which may be used by the diagnostic interface to determine if an application is allowed access to functions of a corresponding transaction function device. For example, a diagnostic interface of a device driver may require communications from a diagnostic application to be digitally signed. The diagnostic interface may then authenticate the digital signature associated with the communication using one or more digital certificates and/or public keys stored in operative connection with the diagnostic interface. When the digital signature is valid, the diagnostic interface is operative to enable the diagnostic application to access the transaction function device through the diagnostic interface. When the digital signature is determined to be invalid, the diagnostic application is denied access to the transaction function device by the diagnostic interface.

In a further exemplary embodiment, the diagnostic application may be required to send a valid digital certificate to the diagnostic interface prior to being granted access to the transaction function device. The digital certificate may be validated by the diagnostic interface using a trusted public key of a certificate authority that issued the digital certificate. The digital certificate may also be evaluated by the diagnostic interface to determine if it has expired. When the digital certificate has expired or is otherwise invalid, the exemplary embodiment of the diagnostic interface may be operatively programmed to return a message to the calling application which indicates that the digital certificate is not valid and access to the transaction function device is denied. In further exemplary embodiments of the present invention other software and/or hardware encryption and/or authentication systems may be combined with the diagnostic interfaces of the device drivers to enable the selective validation of users and/or applications attempting to access transaction function devices through communication with the diagnostic interfaces of device drivers.

The exemplary embodiment of the present invention further comprises a terminal Manager 46. The terminal Manager 46 is a software application that is operative to configure and manage the ATM through interaction with the ODS layer. In addition to the terminal Manager 46 and the terminal application 24, the ODS layer 26 is operative to enable any application that can access ODS components to be operative on a plurality of different XFS enabled ATM hardware platforms.

Thus the exemplary form of the cross-vendor automated transaction machine architecture of the present invention achieves at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover the descriptions and illustrations herein are merely examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained, the new and useful structures, devices, elements, arrangements, parts, combinations, systems, equipment, operations, methods and relationships are set forth in the appended claims.

We claim:

1. An automated transaction machine comprising:
   at least one computer;
   at least one transaction function device; of a first type, wherein the at least one transaction function device is capable of operation to carry out at least one first transaction function, wherein the at least one transaction function device is in operative connection with the at least one computer;
   an extensions for financial services (XFS) software layer operative in the at least one computer;
   a device driver software layer operative in the at least one computer, wherein the device driver layer is operative responsive to the XFS layer to control operation of the at least one transaction function device, wherein the device driver layer includes at least one of a plurality of differently programmed device driver software components, wherein each respective device driver component is operative to control a corresponding transaction function device of the first type, wherein a plurality of mechanically different devices of the first type are capable of being operated in automated transaction machines to carry out the at least one first transaction function, wherein at least one first device driver component included in the device driver layer of the machine is operative to control the at least one transaction function device of the machine;
   an Open Device Services (ODS) software layer, wherein at least a portion of the ODS layer is installed in operative connection with the at least one computer, wherein the XFS layer is operative responsive to the ODS layer to communicate with the device driver layer, and wherein the ODS layer includes a plurality of differently programmed ODS software components, wherein each respective ODS component is operative in conjunction with a respective corresponding one of the plurality of device driver components, wherein the at least a portion of the ODS layer installed in operative connection with the at least one computer includes at least one first ODS component adapted to operate in conjunction with the at least one first device driver component; and
   a terminal software application operative in the at least one computer, wherein the at least one first ODS component is operative responsive to at least one communication from the terminal application to cause the at least one first device driver component to cause the at least one transaction function device of the machine to carry out the at least one first transaction function responsive to communication through the XFS layer, wherein a plurality of ODS components included in the ODS layer are operative responsive to a common at least one communication from the terminal application, to cause at least one respective different communication through the XFS layer, wherein each respective at least one communication through the XFS layer is capable of causing a respective corresponding device driver component to cause a respective one of a plurality of mechanically different transaction function devices to carry out a common at least one transaction function.

2. The automated transaction machine according to claim 1, wherein when the at least one transaction function device is exchanged with a second transaction function device of the same first type and the at least one first device driver component is exchanged with at least one second device driver component that corresponds to the second transaction function device, the ODS layer is operative to enable the at least one first ODS component to be exchanged for at least one second ODS component that corresponds to the at least one second device driver component.

3. The automated transaction machine according to claim 1, further comprising a plurality of transaction function devices in operative connection with the at least one computer, wherein for each respective transaction function device, the device driver layer includes a corresponding at least one device driver component and the ODS layer includes a corresponding at least one ODS component.

4. The automated transaction machine according to claim 1, wherein the terminal application includes at least one transaction element component, wherein the transaction element component is operative to communicate with the ODS layer.

5. The automated transaction machine according to claim 4, wherein the at least one transaction function device includes a first transaction function device capable of performing the at least one first transaction function, and further comprising a second transaction function device in operative connection with the at least one computer and capable of performing at least one second transaction function, wherein the ODS layer includes at least one second ODS component, and wherein the transaction element component is operative responsive to the terminal application to communicate with both the at least one first and the at least one second ODS components to cause the first transaction function device perform the at least one a first transaction function and to cause the second transaction function device perform the at least one a second transaction function.

6. The automated transaction machine according to claim 5, wherein the first transaction function device includes a card reader and the second transaction function device includes a sound output device, and wherein the at least one first transaction function includes returning a card to a user and the at least one second transaction function includes outputting an audible sound.

7. The automated transaction machine according to claim 5, wherein the transaction element component includes an ActiveX component.

8. The automated transaction machine according to claim 5, wherein the transaction element component includes a Java component.

9. The automated transaction machine according to claim 1, wherein the XFS layer includes a first XFS layer, wherein the at least one transaction function device includes a first transaction function device, and further comprising a second XFS layer operative in the at least one computer, and a second transaction function device in operative connection with the at least one computer, wherein the ODS layer includes at least one second ODS component, wherein the device driver layer includes at least one second device driver component, wherein the first ODS component is operative to communicate with the at least one first device driver component through the first XFS layer to control the operation of the first transaction function device, and wherein the at least one second ODS component is operative to communicate with the at least one second device driver component through the second XFS layer to control the operation of the second transaction function device.

10. The automated transaction machine according to claim 9, wherein the first XFS layer includes a WOSA/XFS manager, and wherein the second XFS layer includes a J/XFS kernel.

11. The automated transaction machine according to claim 1, wherein the XFS layer includes a WOSA/XFS manager.

12. The automated transaction machine according to claim 11, wherein the at least one transaction function device includes a cash dispenser.

13. The automated transaction machine according to claim 1, wherein the XFS layer includes a J/XFS kernel.

14. The automated transaction machine according to claim 13, and further comprising a java virtual machine operative in the at least one computer, wherein both the J/XFS kernel and the at least one first ODS component are operative in the java virtual machine.

15. The automated transaction machine according to claim 14, wherein the terminal application includes at least one Java component that is operatively programmed to control the at least one transaction function device through communication with the at least one first ODS component.

16. The automated transaction machine according to claim 1, wherein the at least one first device driver component includes a diagnostic interface, wherein the diagnostic interface is operative to provide an external application with access to at least one internal hardware component of the at least one transaction function device.

17. The automated transaction machine according to claim 16, further comprising a diagnostic software application, wherein the diagnostic application is operative to access the internal hardware component of the at least one transaction function device through communication with the diagnostic interface, wherein communication with the diagnostic interface pass includes communication through the XFS layer.

18. The automated transaction machine according to claim 17, wherein the diagnostic application is operative to deactivate the at least one transaction function device with respect to the XFS layer, responsive to communication through the XFS layer.

19. The automated transaction machine according to claim 17, wherein the internal hardware component includes a motor.

20. The automated transaction machine according to claim 17, wherein the internal hardware component includes a sensor.

21. A method comprising:
a) installing an extensions for financial services (XFS) layer in an automated transaction machine, wherein the machine includes at least one computer and at least one transaction function device of a first type;
b) installing a device driver software layer in operative connection with the at least one computer, wherein the device driver layer includes at least one of a plurality of differently programmed device driver components, wherein each respective device driver component is operative to control corresponding transaction function devices of the first type, wherein a plurality of mechanically different devices of the first type are capable of being operated in automated transaction machines, and wherein at least one first device driver component included in the device driver layer of the machine is operative to control the at least one transaction function device of the machine to carry out at least one transaction function responsive to communication with the XFS layer;
c) installing at least a portion of an Open Device Services (ODS) software layer in operative connection with the at least one computer, wherein the ODS layer includes a plurality of differently programmed ODS software components, wherein each respective ODS component is operative in conjunction with a respective corresponding one of the plurality of device driver components, wherein the at least a portion of the ODS layer installed in operative connection with the at least one computer includes at least one first ODS component that is installed in operative connection with the at least one computer and is adapted to operate in conjunction with the at least one first device driver component; and d) installing a terminal application in operative connection with the at least one computer, wherein the at least one first ODS component is operative responsive to at least one communication from the terminal application to cause the at least one first device driver component to cause the at least one transaction function device of the machine to carry out at least one transaction function responsive to communication through the XFS layer, wherein a plurality of ODS components included in the ODS layer are operative responsive to a common at least one communication from the terminal application, to cause at least one respective different communication through the XFS layer, and wherein each respective at least one communication through the XFS layer is capable of causing a respective corresponding device driver component to cause a respective one of a plurality of mechanically different transaction function devices to carry out a common at least one transaction function.

22. The method according to claim 21, wherein the at least one transaction function device includes a first transaction function device, wherein the automated transaction machine includes a second transaction function device, and further comprising:

e) installing at least one second device driver component in the machine that corresponds to the second transaction function device, wherein the at least one second device driver component is operative responsive to the XFS layer to control the operation of the second transaction function device;

f) installing at least one second ODS component in the machine that corresponds to the at least one second device driver component; and wherein the at least one second ODS component is operative responsive to at least one communication from the terminal application to control operation of the second transaction function device responsive to communication through the XFS layer that causes the at least one second device driver to operate the second transaction function device.

23. The method according to claim 22, wherein in step (a) the terminal application includes a transaction element component, wherein the transaction element component is operatively programmed to control the operation of both the first transaction function device and the second transaction function device though communication with both the at least one first ODS component and the at least one second ODS component.

24. The method according to claim 21, wherein the at least one transaction function device includes a first transaction function device, and further comprising:

e) replacing the first transaction function device with a second transaction function device that of the first type, wherein the second transaction function device is operative to perform the same at least one transaction function as the first transaction function device;

f) installing at least one second device driver component in the machine that corresponds to the second transaction function device, wherein the at least one second device driver component is operative responsive to communication through the XFS layer to control the operation of the second transaction function device;

g) installing at least one second ODS component in the machine that corresponds to the at least one second device driver component; and wherein prior to (e) the terminal application is operative to control operation of the first transaction function device through communication with the at least one first ODS component, wherein the at least one first ODS component is operatively programmed to communicate with the first device driver component through the XFS layer;

and wherein after (g) the terminal application is operative without modification to control the operation of the second transaction function device through communication with the at least one second ODS component, wherein the at least one second ODS component is operatively programmed to communicate with the at least one second device driver component through the XFS layer.

25. The method according to claim 21 further comprising:

e) installing a diagnostic application in the machine, wherein the diagnostic application is operative to communicate with the at least one first device driver component independently of the XFS layer, wherein the at least one first device driver component is operative responsive to the diagnostic application to access hardware components of the at least one transaction function device.

26. A method comprising:

a) receiving at least one input through an input device of an automated transaction machine, wherein the automated transaction machine includes a first transaction function device of a first type capable of carrying out a first transaction function, wherein the automated transaction machine includes a terminal application, at least a portion of an Open Device Services (ODS) layer, at least one extensions for financial services (XFS) layer, and a device driver software layer, wherein the at least one XFS layer includes a first XFS layer, and wherein the device driver layer includes a first device driver software component selected from a plurality of differently programmed device driver software components, wherein each respective device driver software component of the plurality of device driver software components is operative to control operation of one respective transaction function device of the first type, wherein a plurality of mechanically different transaction function devices of the first type are capable of operating in automated transaction machines to carry out the first transaction function, wherein the first device driver component is operative to control operation of the first transaction function device of the machine to carry out the first transaction function responsive to communication with the first XFS layer, where the ODS software layer includes a plurality of differently programmed ODS components, wherein each respective one of the plurality of ODS software components is operative in conjunction with a respective corresponding one of the plurality of device driver components, wherein the at least a portion of the ODS layer included in the automated transaction machine includes a first ODS software component that is adapted to operate in conjunction with the first device driver software component, wherein responsive to communication through the first XFS layer, the first ODS component is operative responsive to at least one communication from the terminal application to cause the first device driver software component to cause the first transaction function device to carry out the first transaction function, wherein a plurality of ODS components included in the ODS layer are operative responsive to the at least one communication from the terminal application, to cause at least one respective different communication through the XFS layer, which such respective different at least one communication through the XFS layer is capable of causing a respective corresponding device driver component to cause a respective one of the plurality of mechanically different transaction function devices to carry out the first transaction function;

b) providing a first communication between the terminal application of the machine and the first ODS component responsive to the at least one input;

c) providing a second communication between the first ODS component and the first XFS layer responsive to the first communication;

d) providing a third communication between the first XFS layer and the first device driver component responsive to the second communication;

e) providing a fourth communication between the first device driver component and the first transaction function device of the machine responsive to the third communication;

f) operating the first transaction function device responsive to the fourth communication to carry out a transaction function.

27. The method according to claim 26, further comprising:

g) providing a fifth communication between the terminal application and a second ODS component responsive to the at least one input;

h) providing a sixth communication between the second ODS component and the first XFS layer responsive to the fifth communication;

i) providing a seventh communication between the first XFS layer and a second device driver component responsive to the sixth communication;

j) providing an eighth communication between the second device driver component and a second transaction function device responsive to the seventh communication; and k) operating the second transaction function device responsive to the eighth communication.

28. The method according to claim 27, wherein the terminal application includes at least one transaction element component, and wherein in steps (b) and (g) the transaction element component is operative to provide both the first communication and the fifth communication.

29. The method according to claim 26, further comprising:

g) providing a fifth communication between the terminal application and a second ODS component responsive to the at least one input;

h) providing a sixth communication between the second ODS component and a second XFS layer responsive to the fifth communication;

i) providing a seventh communication between the second XFS layer and a second device driver component responsive to the sixth communication;

j) providing an eighth communication between the second device driver component and a second transaction function device responsive to the seventh communication; and k) operating the second transaction function device responsive to the eighth communication.

30. The method according to claim 29, wherein in step (b) the first XFS layer includes a WOSA/XFS manager and wherein in step (h) the second XFS layer includes a J/XFS kernel.

31. The method according to claim 26 wherein in step (b) the first XFS layer includes a WOSA/XFS manager.

32. The method according to claim 26 wherein in step (b) the first XFS layer includes a J/XFS kernel.

33. The method according to claim 26 wherein the first transaction function device includes a cash dispenser, wherein step (f) includes dispensing cash with the cash dispenser responsive to the fourth communication.

34. The method according to claim 26, further comprising:

g) providing a fifth communication between a diagnostic application and the first device driver component, wherein the fifth communication does not pass through the first XFS layer; and h) accessing the transaction function device with the first device driver component responsive to the fifth communication.

35. The method according to claim 34, and further comprising:

i) prior to step (h) determining that the diagnostic application is authorized to access the transaction function device through communication with the device driver component.

36. Computer readable media bearing computer readable instructions which are operative to cause at least one computer in an automated banking machine to cause the machine to carry out the method steps comprising:

a) receiving at least one input through an input device of an automated transaction machine, wherein the automated transaction machine includes a first transaction function device of a first type capable of carrying out a first transaction function, wherein the automated transaction machine includes a terminal application, at least a portion of an Open Device Services (ODS) layer, at least one extensions for financial services (XFS) layer, and a device driver software layer, wherein the at least one XFS layer includes a first XFS layer, and wherein the device driver layer includes a first device driver software component selected from a plurality of differently programmed device driver software components, wherein each respective device driver software component of the plurality of device driver software components is operative to control operation of one respective transaction function device of the first type, wherein a plurality of mechanically different transaction function devices of the first type are capable of operating in automated transaction machines to carry out the first transaction function, wherein the first device driver component is operative to control operation of the first transaction function device of the machine to carry out the first transaction function responsive to communication with the first XFS layer, wherein the ODS software layer includes a plurality of differently programmed ODS components, wherein each respective one of the plurality of ODS software components is operative in conjunction with a respective corresponding one of the plurality of device driver components, wherein the at least a portion of the ODS layer included in the automated transaction machine includes a first ODS software component that is adapted to operate in conjunction with the first device driver software component, wherein responsive to communication through the first XFS layer, the first ODS component is operative responsive to at least one communication from the terminal application to cause the first device driver software component to cause the first transaction function device to carry out the first transaction function, wherein a plurality of ODS components included in the ODS layer are operative responsive to the at least one communication from the terminal application, to cause at least one respective different communication through the XFS layer, which such respective different at least one communication through the XFS layer is capable of causing a respective corresponding device driver component to cause a respective one of the plurality of mechanically different transaction function devices to carry out the first transaction function;

b) providing a first communication between the terminal application of the machine and the first ODS component responsive to the at least one input;

c) providing a second communication between the first ODS component and the first XFS layer responsive to the first communication;

d) providing a third communication between the first XFS layer and the first device driver component responsive to the second communication;

e) providing a fourth communication between the first device driver component and the first transaction function device of the machine responsive to the third communication;

f) operating the first transaction function device responsive to the fourth communication to carry out a transaction function;

wherein the at least one further ODS component is adapted to be responsive to the same first communication in (b) from the terminal application to carry out with the first XFS layer at least one further communication that is different than the second communication in (c) and that is operative to cause the at least one further transaction function device through communication with the at least one further device driver component to carry out the same transaction function is carried out in (f).

37. A method comprising:

a) on a first automated transaction machine including at least one first computer, a plurality of devices including a first card reader and a first cash dispenser, and a first extensions for financial services (XFS) software layer operative in the at least one first computer, installing a first service provider software component in the first automated transaction machine, which first service provider software component is operative responsive to communication with the first XFS layer to cause a first device of the plurality of devices to carry out a first function, wherein the first device is of a first type, wherein the first service provider software component corresponds to one of a plurality of differently programmed service provider software components usable with an XFS layer, wherein each of the plurality of service provider software components is operative to control one of a plurality of mechanically different corresponding devices of the first type, each of which devices are capable of being operated in automated transaction machines to carry out the first function;

b) providing a first software layer comprising a plurality of differently programmed software components, each component respectively adapted to operate in conjunction with a respective corresponding service provider component, wherein the plurality of software components includes a first software component adapted to operate in conjunction with the first service provider software component;

c) installing a first terminal application on the first automated transaction machine in operative connection with the at least one first computer; and d) configuring the first software component in operative connection with the at least one first computer such that the first software component is operative responsive to at least one first communication from the first terminal application to carry out a first communication through the first XFS layer, wherein the first communication is operative to cause the first service provider software component to cause the first device to carry out the first function, wherein a plurality of the software components in the first software layer are operative responsive to the at least one first communication from the first terminal application, to cause a respective different at least one communication through the XFS layer, wherein each respective at least one communication through the XFS layer is capable of causing a respective corresponding service provider component to cause a respective corresponding device of the first type, to carry out the first function.

38. The method according to claim 37, and further comprising:

e) on a second automated transaction machine including at least one second computer, a plurality of further devices including a second card reader and a second cash dispenser, and a second XFS software layer operative in the at least one second computer, installing a second service provider software component in the second automated transaction machine which is operative responsive to communication from the second XFS software layer to cause a second device of the plurality of further devices, to carry out the first function, wherein the second device is of the first type;

f) providing the first software layer, wherein the first software layer includes a second software component adapted to operate in conjunction with the second service provider software component;

g) installing the first terminal application in the second automated transaction machine in operative connection with the at least one second computer; and h) configuring the second software component in operative connection with the at least one second computer such that the second software component is operative responsive to the at least one first communication from the first terminal application installed on the second automated transaction machine, to carry out a second communication through the second XFS layer that is different than the first communication through the first XFS layer in (d), to cause the second service provider software component to cause the second device to carry out the first function.

39. The method according to claim 37, wherein in (b) the plurality of components include Open Device Services (ODS) components.

40. The method according to claim 37, wherein (b) includes installing the first software layer in operative connection with the at least one first computer.

41. The method according to claim 37, wherein in (a) the first device includes the first cash dispenser.

42. An method comprising:
a) on an automated transaction machine comprising at least one computer, a plurality of devices including a card reader and a cash dispenser, at least one terminal application operative in the at least one computer, and at least two extensions for financial services (XFS) layers operative in the at least one computer, providing at least one first device driver software component operative responsive to communication through a first one of the XFS layers to cause at least one first device of the plurality of devices to operate, and providing at least one second device driver software component operative responsive to communication through a second one of the XFS layers to cause at least one second device of the plurality of devices to operate;
b) installing on the automated transaction machine; an intermediate layer comprising: at least one first intermediate component that is operative responsive to the terminal application to provide at least one first communication to the first one of the XFS layers, which at least one first communication is operative to cause the first one of the XFS layers to cause the at least one first device driver to cause the at least one first device to operate; and at least one second intermediate component that is operative responsive to the terminal application to provide at least one second communication to the second one of the XFS layers, which at least one second communication is operative to cause the second one of the XFS layers to cause the at least one second device driver to cause the at least one second device to operate; and
c) responsive to the terminal application communicating with the intermediate layer, causing the first and second devices to operate.

43. The method according to claim 42, wherein in (a) the first one of the XFS layers includes a WOSA/XFS Manager; wherein in (a) the second one of the XFS layers includes a J/XFS Kernel.

* * * * *